United States Patent [19]
Hutton et al.

[11] 3,904,518
[45] Sept. 9, 1975

[54] WASTE WATER TREATMENT PROCESS

[75] Inventors: David Glenn Hutton, Newark; Francis Leonard Robertaccio, Hockessin, both of Del.

[73] Assignee: E. I. Du Pont de Nemours and Company, Wilmington, Del.

[22] Filed: May 27, 1971

[21] Appl. No.: 147,399

Related U.S. Application Data

[63] Continuation-in-part of Ser. No. 98,675, Dec. 16, 1970, abandoned, which is a continuation-in-part of Ser. No. 2,846, Jan. 14, 1970, abandoned.

[52] U.S. Cl. ............... 210/11; 210/17; 210/18; 210/40
[51] Int. Cl.² ............... C02C 1/06; C02C 5/10
[58] Field of Search ............... 210/3–9, 14, 210/15, 17, 18, 39–41, 60, 63, 11

[56] References Cited
UNITED STATES PATENTS

| | | | |
|---|---|---|---|
| 1,617,014 | 2/1927 | Derleth | 210/7 |
| 1,915,240 | 6/1933 | Putnam | 210/6 |
| 2,059,286 | 11/1936 | Statham | 210/18 X |
| 3,275,547 | 9/1966 | Bucksteeg et al. | 210/18 |
| 3,300,403 | 1/1967 | Kehoe | 210/18 X |
| 3,356,609 | 12/1967 | Bruemmer | 210/7 |
| 3,401,113 | 9/1968 | Pruessner et al. | 210/7 |
| 3,490,590 | 1/1970 | Davies | 210/18 X |
| 3,803,029 | 4/1974 | Blecharczyk | 210/40 X |

OTHER PUBLICATIONS

Rudolfs et al., "Activated Carbon in Sewage Treatment," Sewage Works Journal, Vol. 7, Sept. 1935, pp. 852, 863 and 880.
Keefer, Sewage Treatment Works, First Ed., McGraw-Hill, N.Y., 1940, pp. 308–314.
"Evaluation of Various Adsorbents, etc.," AWTR-12, U.S. Dept. of H.E.W., June 1964, pp. 13–22.

*Primary Examiner*—Thomas G. Wyse

[57] ABSTRACT

Waste water is purified by a process which comprises subjecting the waste water to a biological treatment process in the presence of activated carbon or fuller's earth. A gas containing molecular oxygen is distributed within the liquid mixture during treatment to provide oxidation means. The process efficiently reduces the biochemical oxygen demand, chemical oxygen demand and total organic content of the waste water in an unusually rapid manner, and removes material not normally removed by the biological treatment alone.

10 Claims, 1 Drawing Figure

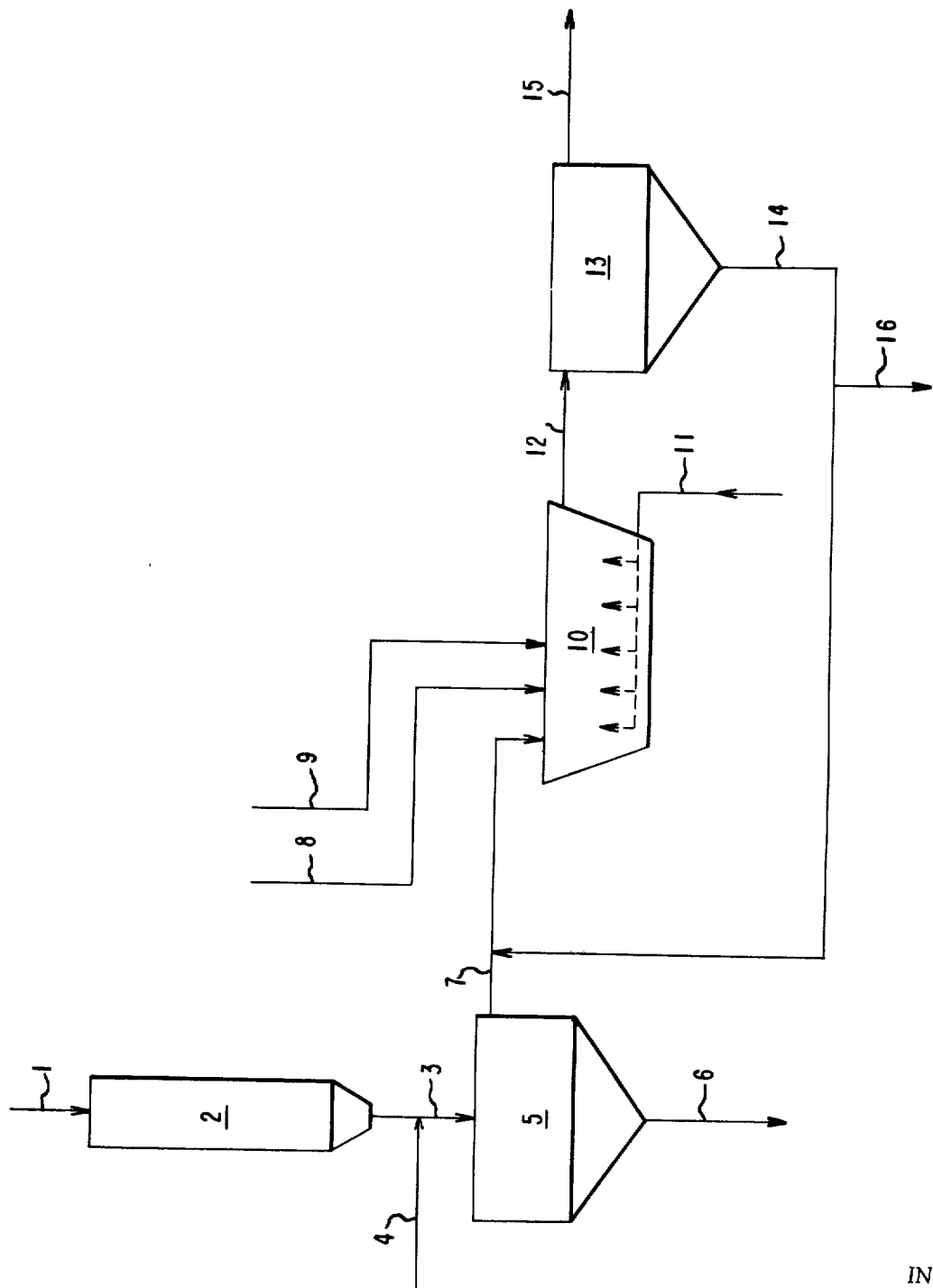
INVENTORS
DAVID G. HUTTON
FRANCIS L. ROBERTACCIO
BY
ATTORNEY

WASTE WATER TREATMENT PROCESS

CROSS-REFERENCE TO RELATED APPLICATIONS

This application is a continuation-in-part of copending application Ser. No. 98,675 filed Dec. 16, 1970, now abandoned, which in turn is a continuation-in-part of application Ser. no. 2,846, filed Jan. 14, 1970, now abandoned.

BACKGROUND OF THE INVENTION

1. Field of the Invention

This invention relates to a process for purifying waste water. More specifically the invention is directed to a biological process for treating such waste.

2. Background of the Invention

The growing problem of water pollution has received wide recognition. In the past, water contaminated with residential and industrial pollutants (waste water) has been purified by settling of solids suspended in the waste water. This settling process has become known as "primary" treatment. Frequently, further treatment of the water is carried out through the action of aerobic bacteria on the waste pollutants. This further treatment, known as "secondary" treatment involves the biological decomposition of the waste pollutants by supplying oxygen to bacteria which feed on the combination of oxygen and nutriments in the waste, thereby breaking down much of the waste material into removable solids and carbon dioxide. This "secondary" treatment is commonly practiced by the means of the trickling filter process, oxidation ponds, the activated sludge process. A "tertiary" treatment, usually treatment with chemicals, is sometimes carried out and is directed to the removal of specific objectionable materials, e.g., ion exchange resins may be used to reduce inorganic content or activated carbon may be used to remove color.

The quantity of pollutants in waste water is commonly determined by measuring the amount of dissolved oxygen required to biologically decompose the waste organic matter in the polluted water. This measurement, called BOD (biochemical oxygen demand), provides an index of the organic pollution of water. Some organic contaminants, such as chlorinated aromatics, are not amenable to conventional biological decomposition and tests such as chemical oxygen demand (COD) and total organic carbon (TOC) have been employed.

Because of the increases in population and industrialization, it is desirable to reduce the time of total waste water treatment and to increase the capacity of treatment plant facilities. Further, since biological degradation is sometimes not entirely satisfactory with some non-domestic wastes, e.g. waste from chemical plants, it is desirable to provide a waste treatment process of such flexibility as to be useful with both industrial and urban residential waste water as well as wastes from hospitals, government installations and waste mixtures from such sources.

A process has now been discovered which efficiently reduces the biochemical oxygen demand, chemical oxygen demand and total organic content of waste water in an unusually rapid manner. In addition the process of this invention greatly increases the rapidity and completeness of sludge settling after treatment of the waste water in an activated sludge process and effectively removes many non-biodegradable organic impurities not normally removed in biological treatment.

SUMMARY OF THE INVENTION

In summary this invention is directed to an improvement in the process of continuously purifying waste water comprising 1. contacting in a treatment zone a mixture of
   a. waste water which has a pH of between about 4 and 11 and which optionally has been subjected to primary treatment to remove solids, and
   b. biologically active solids in an amount sufficient to provide a total suspended solids content of the mixture of between about 10 and 50,000 parts per million,
2. mixing a gas containing molecular oxygen through the mixture, and
3. removing the mixture from the treatment zone; the improvement comprising adding to the mixture between about 50 and 1500 parts of activated carbon or between about 250 and 2500 parts of adsorptive fuller's earth per million parts of feed waste water, said carbon or fuller's earth having a surface area of at least 100 square meters per gram and a particle size such that it will pass through a 200 mesh per inch sieve.

DESCRIPTION OF THE DRAWING

The DRAWING is a schematic representation of the steps involved in one form of water treatment facility for the treatment of waste water as described herein.

DESCRIPTION OF THE INVENTION

Waste water to be purified by the process of this invention should first be treated, as required and if necessary, to adjust the pH to between 4 and 11, preferably to between 6 and 9, and most preferablly to about 7 ± 0.5. This can be achieved by treating acidic waste with lime, limestone, sodium hydroxide or other base, or by treating alkaline waste water with an acid such as sulfuric or hydrochloric acid. When these neutralization processes produce excessive precipitation, or when the original waste contains excessive solids, the waste water can be clarified by settling, decantation or filtration to provide an effluent practically free of solid products. Domestic waste water normally does not require any neutralization, but should first be subjected to primary treatment to remove the bulk of suspended solids from the raw waste water, if said solids are present in excessive amounts.

After the above pre-treatment steps, the waste water is passed into a treatment zone where it is purified by biological oxidation treatment in the presence of adsorptive (activated) carbon or fuller's earth. The adsorptive carbon or fuller's earth can be added to the water just prior to entry of the water in the treatment zone, it can be present in the treatment zone prior to entry of the water, or it can be added to the zone after the waste water has entered. In a continuous process, it is preferably added to the zone as fresh waste water enters.

It is important that the amount of carbon or fuller's earth employed provide between 30 and 1000 square meters or surface per liter of waste water treated. The carbon or fuller's earth must be finely divided. By the term "finely divided" is meant that the carbon or fuller's earth should be of such particle size that it will pass through a 200 mesh per inch sieve. In addition the carbon or fuller's earth should have a surface area of at least 100 square meters per gram. The surface area can be measured by the method of Brunauer et al., J. Am. Chem. Sci. 60 309 (1938). Activated carbon having a surface area of about 1400 square meters per gram can be obtained commercially, but this figure does not represent a maximum figure for use in the process of this invention.

Examples of activated carbon or fuller's earth that can be employed in the process of this invention include carbon produced from the destructive distillation of vegetable matter such as lignite, coal, pulp mill residues, nut shells and petroleum residues. As used herein the term fuller's earth is defined as that group of highly sorptive clays that are crystalline, hydrated magnesium aluminum silicates characterized by a chain-like structure and a high surface area. Examples of fuller's earth include attapulgus clay (consisting of 80–90% attapulgite). Activated carbon is preferred because of its higher surface area and unique surface properties which provide for greater efficiency of the process.

Because activated carbon usually has more surface area per gram than the fuller's earth, e.g., activated carbon can have a surface area of between 600–1400 square meters per gram (Aqua Nuchar has a surface area of 675 square meters per gram), while commercial Emathlite fuller's earth has a surface area of 124 square meters per gram, the preferred amount of activated carbon employed in the process will be less than the amount of fuller's earth required. It will be understood that where the character of the waste water is not constant, no absolute prescription for surface area requirements can be provided. Moreover, rate of carbon or fuller's earth application will vary as the requirement of the treated waste water vary.

Normally the ratio of parts per million carbon to parts per million BOD feed will range between about 0.25 and 3.5. Lower ratios of carbon to BOD have not shown measurable improvement in numerous experiments with activated sludge processes. However, it might be expected that lower ratios could be effective in oxidation ponds. Higher ratios, while operable, are not economically desirable.

The biologically active solids employed can be the same type solids that are presently used in the commonly called "activated sludge" process of water purification, or those active solids found in oxidation ponds and other biological water treatment processes. It is preferable in the operation of the process of this invention, that the waste water in the treatment zone contain a concentration of total suspended solids of between about 25 and 15,000 parts per million. However, the benefits of this invention are realized even when total solids are as low as about 10, or as high as about 50,000 parts per million. If it is found necessary to add biologically active solids to fulfill the concentration requirements, domestic sewage sludge, as from a city sewage plant activated sludge aerator, can be employed. Of course, once an activated sludge process produces its own biologically active solids, the solids are ordinarily recycled to ensure proper level of bacteria concentration. The oxidation pond process, once it has reached a suitable concentration of biologically active solids, tends to maintain that level without solids addition. The term "biologically active solids" as used herein refers to its normal meaning in biological treatment process for waste water. Specifically it is those suspended solids which contain different types of bacteria formed by contacting waste water, bacteria and oxygen. In the process of this invention the total suspended solids includes the activated carbon or fuller's earth and the biologically active solids.

Once the waste water, biologically active solids and carbon or fuller's earth are in the treatment zone, oxygen is supplied to the mixture, usually by supplying air, and preferably by means of spargers or similar distributors in a manner which causes dissolution of oxygen in the liquid mixture and which provides agitation to mix the ingredients of the mixture. Additional agitation may also be provided by mechanical stirrers.

Reaction time can range from about 2 hours to about 30 days or more. The process is conveniently conducted at temperatures between about 5° and 35°C. and at atmospheric pressure. These time, temperature and pressure conditions are not critical. Preferably the process is carried out continuously and the flow rates are adjusted to provide a reaction time of about 2 to 10 hours for activated sludge processes and about 2 to 10 days for oxidation ponds.

Nitrogen and phosphorus are both essential nutrients for the metabolism of biological life forms, and if they are not already present in the waste water mixture, they can be added, for example in the form of ammonium phosphate salt. Although not critical, the weight ratio of BOD feed, nitrogen atoms and phosphorus atoms is usually about 100:5:1, although more nitrogen and phosphorus can be present.

After treatment in the treatment zone, the liquid mixture may be suitable for reuse as is, but ordinarily it is preferred to pass the mixture into a separation zone where the biologically active solidis and carbon or fuller's earth are separated from the water, usually by settling. A portion of the biologically active solids is returned to the treatment zone in order to maintain proper concentration of sludge in the traditional activated sludge process.

The process of this invention generally reduces the amount of $BOD_5$ (5 days biochemical oxygen demand) by over 95%; whereas the conventional biological processes generally result in less $BOD_5$ removal. In a typical instance, as shown following, the results of the purification of industrial waste water by the activated sludge process with and without the addition of activated carbon were as follows:

| Activated Sludge Process | | |
|---|---|---|
| | Without Carbon | With Carbon (400 ppm) |
| BOD, ppm | | |
| before | 156 | 148 |
| after | 36 | 6.5 |
| COD, ppm | | |
| before | 351 | 351 |
| after | 168 | 54 |
| % removal of BOD | 79 | 96 |

Referring now to the drawing, which schematically represents an activated sludge process, one embodiment of the abovedescribed treatment, stream 1 represents settled waste water entering the treatment system. Column 2 represents a limestone packed column where any gross acidity can be neutralized. The effluent from column 2 proceeds via line 3 to clarifier 5, the pH of the water being adjusted en route to about 6.5 to 7.5 by addition of base, e.g. sodium hydroxide, solution through line 4. In clarifier 5 any solids formed in the neutralization are settled out and removed via line 6. The clear effluent from clarifier 5 proceeds via line 7 to the treatment zone 10, where the biological oxidation occurs. An aqueous slurry of activated carbon is added through line 8, and nutrient for the bacteria in the form of phosphate and/or ammonium salts in water solution is added through line 9, if required. As discussed above, while municipal sewage contains ample amounts of these nutrients, the more specialized types of waste from industrial plants may lack them, and they must be added in order to maintain vigorous bacterial action. In the treatment zone 10 bacterial oxidation of waste occurs in the presence of the activated carbon and air or oxygen added through line 11. The air or oxygen is added through a sparger or other device to aid in agitation of the reaction zone contents as well as provide oxygen to the aerobic bacterial. (An aeration time of about 2½ hours has been found to be sufficient for the successful oxidation of a chemical plant waste.) The treatment zone 1 must be sized to provide the desired amount of contact of waste water, bacteria, oxygen and activated carbon. Also added to the mixture in the treatment zone 10 is a flow of settled sludge from the clarifier 13 through lines 14. This is the sludge which steadily renews and maintains the bacterial activity necessary for oxidation and removal of the impurities in the waste water. After the necessary residence time, the continuously flowing treated waste is led to the clarifier 13 through line 12. In the clarifier 13 the carbon-containing sludge settles, and the clear effluent water overflows to river or stream or to re-use through line (15). As described before, some of the settled sludge from the clarifier 13 is returned through lines 14 to the treatment zone 10. The remainder of the sludge is removed through line 16 to be treated for recovery and reactivation of the carbon, or, where economically more advantageous, to be discarded. The process can be operated similarly by replacing the activated carbon with adsorptive fuller's earth.

Of course, in the operation of the process of this invention, certain additional steps may follow or precede it. These additional steps will depend upon local conditions. For example, one such additional step is aeration for removal of odoriferous gases, such as hydrogen sulfide. Another example is coagulation of solid contaminants with inorganic materials or organic polymers. It is even conceivable that oxidation pond treatment might be used in conjunction with an activated sludge treatment, with activated carbon or fuller's earth employed in either or both stages. The process of this invention is compatible with such steps, for it is not concerned with primary sewage treatment, nor with odor or color removal per se nor with treatment of sludge itself.

Through the use of finely divided activated carbon or fuller's earth, the activated sludge process for the treatment of waste water is significantly improved upon. Not only does the presence of these additives cause a greater percentage of BOD removal, but BOD removal is accomplished in a much shorter time. For example, in identical procedures, the activated sludge process with no activated carbon present showed a BOD percent removal of 68% and a TOC percent removal of 60% at an aeration time of 7.6 hours; while when activated carbon was added, BOD removal percentage was 95% and TOC removal percentage was 85%, at an aeration time of only 2.5 hours (a 67% reduction in time or aeration).

Another important advantage of the use of activated carbon or fuller's earth in an activated sludge process is in the rapidity and the completeness with which the sludge settles after treatment in the treatment zone. The presence of these additives apparently induces a rapid settling of the sludge which is more complete than a settling when the additives are not present. In addition, the sludge is of a greater density than it is in the process not using carbon or fuller's earth. Even minimum amounts of carbon have shown a 50% reduction in sludge volume index.

Another advantage of the use of activated carbon or fuller's earth in biological treatment of waste water is in a "smoothing out" of the variation in efficiency caused by changes in the impurity concentration of the feed waste water composition. The activated carbon or fuller's earth absorb impurities to a greater degree as impurity concentration increases and desorb them whenever impurity concentration decreases.

Still another advantage of the process of this invention is that it provides, in a continuous process, effective removal of many non-biodegradable organic impurities which are often a part of industrial waste streams. Furthermore, the presence of the activated carbon or fuller's earth aids in removing color, odors, and contaminents which cause foam from the waste water.

In summary, the process of this invention can reduce the size of treatment zones needed to process a selected volume of waste water over that necessary in present biological treatment processes, thus lowering initial plant cost. It can increase the efficiency of treatment over that of present biological treatment processes for a particular volume of waste water to be treated by lowering treatment time and allowing higher flow rates.

Thus this invention provides, without a multiplicity of steps, a process which removes BOD, colored impurities and refractory organic compounds, offering a solution to a variety of the new problems involved in the purification of waste water. The apparent synergistic action of activated carbon or fuller's earth in the biological environment is surprising and unexpected, and affords a significant improvement in waste water treatment technology.

In the Examples which follow, BOD and COD were determined in accordance with the procedures provided on pages 415 and 510 respectively of "Standard Methods for Examination of Water and Waste Water", 12th edition, 1965, published by The American Public Health Association, The American Water Works Association and The Water Pollution Control Federation. Total Organic Carbon Content was determined with a carbonaceous analyzer (Beckman Instruments Co., Model 915). Surface area of the activated carbon or fuller's earth employed can be determined by the nitrogen adsorption method of Brunauer, Emmett and Teller, J. Am. Chem. Soc. 60, 309 (1938).

The Examples below are intended to be illustrative only and are not to be considered limiting.

EXAMPLE 1

Experiments were conducted using the general sequence described in the drawing and employing several duplicates of the apparatus in order to compare process variations. In starting up the tests, a treatment zone 10 was loaded with a quantity of sludge from the secondary treatment of a municipal sewage treatment plant in order to provide a source of biological life forms for the treatment vessel. About one to two weeks of operation was needed for acclimatization of the biological species to the new environment when industrial plant effluent was processed. Once the biological species were acclimatized, steady-state conditions were attained.

In the first experiment the waste water feed used was waste water effluent from the settled waste of a large multi-product chemical plant. Waste water was fed to limestone treatment column 2 through line 1 at 25 ml. per minute. The pH of the waste water at exit from column 2 was about 4.3 and the water was neutralized to about 7.0 by adding a 10% sodium hydroxide solution through line 4. The neutralized waste water feed was transferred through line 3 to a clarifier 5 where a small amount of solid material settled out and was discarded. The clear overflow from the clarifier 5 was transferred through line 7 to the treatment zone 10. An aqueous slurry of activated carbon was added through line 8, and a solution of ammonium phosphate was added through line 9 in an amount sufficient to maintain the weight ration BOD:N:P at about 100:5:1. Total suspended mixed liquor solids in the treatment zone 10 was kept at about 5000 ppm of waste water by adjusting flow of recycled sludge from the clarifier 13 through line 14. The term mixed liquor solids as used herein means all suspended solids in the treatment zone regardless of type, i.e., sludge sewage, sand, carbon or fuller's earth. Air was bubbled vigorously into the mass in the treatment zone 10 through sparger pipe 11. The reaction time in the treatment zone 10 was adjusted by changing feed rates but maintaining the ratios of wastewater, carbon and nutrient solution as desired. Overflow effluent from the treatment zone 10 was transferred through line 12 to the clarifier 13, where sludge settled to the bottom for recycle through lines (14) and 7 to the treatment zone 10 or was drawn off through line 16. The overflow effluent from the clarifier 13 exited from the system through line 15. This effluent comprised the purified water of the process.

The results of tests comparing operation of the process with and without activated carbon are shown in Table 1 below. The activated carbon used had an available surface are of 900–1000 square meters per gram (Darco KB obtained from the Atlas Chemical Co.). In these tests the activated carbon feed rate was 400 parts per million parts of waste water, and the activated carbon particle size was less than 200 mesh per inch. Ratio of ppm carbon to ppm BOD was 2.38. Reaction time is defined as aerator volume divided by waste water feed rate.

TABLE 1

|  | Carbon | No Carbon |
|---|---|---|
| Period of operation, days | 6 | 6 |
| Reaction time, hours | 7.3 | 7.3 |
| Influent BOD (unfiltered) ppm | 168 | 168 |
| Effluent BOD (unfiltered) ppm | 5.4 | 73 |
| Influent COD (unfiltered) ppm | 381 | 381 |
| Effluent COD (unfiltered) ppm | 63 | 182 |
| Influent color, A.P.H.A. units | 800 | 800 |
| Effluent color | 40 | 800 |
| % BOD removal | 96.3 | 78.6 |
| % COD removal | 85.8 | 55.9 |
| Carbon feed rate, ppm of waste water feed | 400 | — |

The combined carbon activated sludge settled out in the settler-clarifier 13 much more rapidly and completely than the corresponding sludge in the comparative non-carbon run.

Color was determined by the method described in "Standard Methods for Examination of Water and Waste Water," 12th Edition, page 127 published in 1965 by the Am. Publ. Health Association, Amer. Water Works Association and The Water Pollution Control Federation. The color standards and units are commonly referred to as "A.P.H.A." "P. H. A." standard and units.

EXAMPLE 2

In this example a number of comparative tests were made using two different activated carbons and different amounts thereof. The procedures and concentrations were as described in Example 1, (unless otherwise noted below) using an industrial waste water from the large multi-product chemical plant of Example 1. Results are shown in Table 2 following.

TABLE 2

| Carbon Type | Nuchar C115 | | Aqua Nuchar A | |
|---|---|---|---|---|
| Treatment level, carbon ppm of waste water | 300 | 300 | 200 | 100 |
| Surface area, meters²/gram | 846 | 675 | 675 | 675 |
| Waste water feed rate, ml./min. | 32 | 32 | 30.5 | 31.3 |
| Temperature, °C. | 24° | 24° | 24° | 24° |
| Volume of settled sludge, % of solution volume | 10.3 | 10.9 | 8.9 | 8.4 |
| BOD of feed, ppm | 101 | 86 | 61 | 65 |
| BOD of effluent product, ppm | 3.1 | 3.8 | 2.8 | 2.4 |
| Organic carbon, feed, ppm | 95 | 74 | 65 | 68 |
| Organic carbon effluent product, ppm | 10.3 | 13.2 | 13.4 | 18.3 |
| % Removal BOD | 97 | 96 | 95 | 96 |
| % Removal TOC | 89 | 82 | 79 | 73 |
| Effluent color | colorless | colorless | very pale yellow | pale yellow |
| Aeration Time (min.) | 159 | 159 | 165 | 162 |
| Carbon particle size less than 200 mesh per inch | | | | |

Upon examining the data in Table 2 it is seen that very satisfactory (95%) removal of BOD is attained even at the 100 ppm carbon level, but that TOC removal is more relatable to the amount of carbon surface supplied.

EXAMPLE 3

Side-by-side experiments were performed by the procedure described in Example 1 but using the effluent from a municipal primary sewage treatment plant as feed, without neutralization. One experimental treatment used the conventional activated sludge process while two others involved carbon treatment at two levels. Carbon used was Aqua Nuchar A (as descried in Example 2). The tests were run continuously over a period of 15 days. The results are shown in Table 3 following

TABLE 3

|  | 213 ppm carbon | 83 ppm carbon | no carbon |
| --- | --- | --- | --- |
| Reaction time, hours | 3.7 | 3.7 | 4.0 |
| Temperature, °C. | 22 | 22 | 22 |
| BOD in feed (ppm) | 183 | 183 | 183 |
| TOC in feed (ppm) | 84 | 84 | 84 |
| % BOD removal | 87 | 87 | 83 |
| % TOC removal | 87 | 86 | 81 |
| BOD in effluent (ppm) | 23 | 24 | 32 |
| TOC in effluent (ppm) | 11 | 12 | 16 |
| ppm carbon/ppm BOD in feed | 1.14 | 0.29 | — |
| Sludge volume index, ml./gram | 24 | 41 | 73 |

EXAMPLE 4

In another test with municipal waste water, the side-by-side laboratory units were operated as in Example 3, using activated carbon (Aqua Nuchar A as described in Example 2) in one unit. The activated sludge unit without carbon addition was followed by a single stage slurry tank for carbon addition to effect tertiary treatment. As shown in Table 4, the activated sludge unit with carbon added removed more COD and TOC than the conventional series process where carbon tertiary treatment followed activated sludge treatment.

TABLE 4

| System | Carbon Treatment of Invention | Tertiary Carbon Treatment | No Carbon |
| --- | --- | --- | --- |
| Reaction time, hours | 2.2 | 5.0 | 2.4 |
| Carbon, ppm of feed | 222 | 205 | — |
| BOD in feed, ppm | 169 | 167 | 167 |
| BOD in effluent, ppm | 15.0 | — | 28.0 |
| COD in feed, ppm | 247 | 247 | 247 |
| COD in effluent, ppm | 31 | 43 | 61 |
| TOC in feed, ppm | 93 | 93 | 93 |
| TOC in effluent, ppm | 10 | 12 | 19 |
| % BOD removal | 91 | — | 82 |
| % COD removal | 88 | 83 | 75 |
| % TOC removal | 89 | 86 | 79 |
| ppm carbon/ppm BOD iin feed | 1.97 | 1.56 | — |

EXAMPLE 5

Waste water from a synthetic textile fiber producing plant was neutralized to about pH 7 and treated in a laboratory activated sludge apparatus. (Pope Scientific, Inc., as BSB–100 Bench-Scale Bio-Oxidation Apparatus) A 17 day test was run using acclimated sludge from the textile fiber plant activated sludge unit. With 150 ppm carbon (Aqua Nuchar A described as in Example 2) addition and 10 hours aeration, average removals were 97.4% BOD and 72.2% COD. A parallel unit without carbon addition could not be run for longer than 2 days at a time because of foaming and sludge flotation, which did not occur in the process of the invention. By comparison, the plant-scale activated sludge unit with 10 hours aeration gave an average of 92.6% BOD removal and 62.7% COD removal during the same period. Results are tabulated in Table 5.

TABLE 5

| Method of operation | Process of Invention | Activated Sludge — no carbon |
| --- | --- | --- |
| Average aeration time | 10 hours | 10 hours |
| Carbon ppm of feed | 150 | none |
| BOD of feed, ppm | 470 | 642 |
| COD of feed, ppm | 1126 | 1174 |
| BOD of effluent, ppm | 12 | 49 |
| COD of effluent, ppm | 304 | 421 |
| BOD removal, % | 97 | 93 |
| COD removal, % | 72 | 63 |
| ppm carbon/ppm BOD in feed | 0.32 | — |

EXAMPLE 6

Waste water from a textile finishing mill containing an average of about 20% domestic sewage was used for this example. The water was neutralized to about pH 7 and treated in parallel laboratory activated sludge units consisting of a 2.5 l. aerator and 1.25 l. clarifier with sludge recycle, as in Example 1. Results of these experiments are shown in Table 6. Carbon employed was Aqua Nuchar A as described in Example 2. As can be seen, the carbon addition improved TOC, COD, and BOD removal. The carbon addition also reduced foaming.

TABLE 6

| Type of Operation | Process of Invention | Activated Sludge — no carbon |
| --- | --- | --- |
| Carbon, ppm of feed | 231 | none |
| Average aeration time | 4.27 | 4.93 |
| Mixed liquor suspended solids, grams per liter | 7.3 | 2.8 |
| BOD in feed, ppm | 189 | 199 |
| COD in feed, ppm | 356 | 356 |
| TOC in feed, ppm | 137 | 135 |
| BOD in effluent, ppm | 22 | 37 |
| COD in effluent, ppm | 85 | 140 |
| TOC in effluent, ppm | 34 | 54 |
| BOD removal, % | 88 | 80 |
| COD removal, % | 76 | 60 |
| TOC removal, % | 75 | 60 |
| Sludge volume index, ml./gram | 53 | 131 |
| ppm carbon/ppm BOD in feed | 1.24 | — |

The sludge volume percent shown in these examples is equal to the volume % of sludge settled in 30 minutes divided by the weight of the dried settled sludge. The more dense the sludge, the lower the sludge volume index will be.

BOD analytical procedure used for this example and Example 5 utilized the Hach Chemical Company, Model 1791 Manometric BOD apparatus for determining the BOD values. A carbon treatment of the activated sludge process effluent (last column) with 200 ppm of Aqua Nuchar A (described as in Example 2) produced an effluent with a total average COD removal of 68.5% and a total average TOC removal of 66.1%, both of which are less than the corresponding values of 74.6% and 74.5% obtained in the process of the invention.

EXAMPLE 7

In this example the performance of fuller's earth was measured in comparison with activated Aqua Nuchar A carbon, as described in Example 2. Parallel runs were made by the procedure described in Example 1. Data resulting are shown in Table 7 for different levels of treatment.

TABLE 7

| Type of Operation | Process of Invention | Process of Invention | Activated Sludge — no Carbon or Clay |
|---|---|---|---|
| Carbon, ppm of feed | 73 | — | — |
| Fuller's Earth, ppm of feed ("Emathlite" VMP-3000 from Mid-Florida Mining Company) | — | 350 | — |
| % TOC removal | 50 | 38 | 28 |
| % BOD removal | 91 | 77 | 78 |
| Aeration time, hours | 2½ | 5½ | 5 |
| ppm carbon or fuller's earth/ppm of BOD in feed | 0.9 | 2.5 | — |

The superiority of the process of the invention is clearly shown. The amount of carbon and fuller's earth used are at the low end of the desired proportion.

EXAMPLE 8

Three identical laboratory activated sludge treatment units like those used in Example 1 were started up side-by-side, using as feed the waste water from a large chemical plant. To start, these 2.5 liter mixed liquor tanks were charged with 1.25 liters of concentrated sludge (about 10 g/l) from a large municipal sewage treatment plant, along with 5 grams of Aqua Nuchar A (described as in Example 2) carbon to units B and C. Neutralized waste water was fed at 8 ml./min. to each unit, and the TOC removal was determined at intervals of several days. As shown in Table 8, the units with the carbon added became acclimated more rapidly to the waste water and gave better TOC and BOD removals.

This experiment illustrates the value of the process of the invention in starting up an activated sludge plant or in recovery after an upset in which the biological life forms have been destroyed or very seriously depleted. Presence of activated carbon promotes the attainment of satisfactory treatment level in a much shorter time then when it is not present.

TABLE 8

| Side-by-Side Startup | | | |
|---|---|---|---|
| Unit | A | B | C |
| Carbon addition rate, mgC/liter feed water | 0 | 50 | 200 |
| % TOC removal | | | |
| day 3 | 26 | 28 | 62 |
| day 6 | — | 49 | 63 |
| day 10 | 38 | 55 | 79 |
| % BOD removal | | | |
| day 3 | 60 | 62 | 76 |
| day 6 | 38 | 77 | 82 |

EXAMPLE 9

Using the procedure of Example 3, four side-by-side laboratory activated sludge systems were operated on primary settled municipal waste water. The aerators in these systems were baffled into four sections each so the flowing waste water had to proceed from section to section via a narrow slit at the bottom of the tank. Air or oxygen was applied to each of the four sections. Baffling of this sort provides a "cascade" or "plug flow" system, with mixing in each section. All sections were open to the atmosphere. Results tabulated in Table 9 below show that in addition to improving BOD and TOC removal the process of this invention also converted ammonia nitrogen to soluble nitrates to a much greater degree than conventional activated sludge operation. Sludge volume index was also much improved.

TABLE 9

| Oxidizing Gas | Air | | Oxygen | |
|---|---|---|---|---|
| Process | Activated Sludge No Carbon | Process of Invention | Activated Sludge No Carbon | Process of Invention |
| Carbon, ppm of feed | 0 | 145 | 0 | 145 |
| Aeration time, hrs. | 2.67 | 2.41 | 2.22 | 2.40 |
| Dissolved oxygen in aerator sections, ppm | 0.1 to 7.0 | 0.1 to 7.0 | 10.0 to 20.0 | 10.0 to 20.0 |
| % BOD removal | 84 | 94 | 89 | 98 |
| % TOC removal | 65 | 87 | 58 | 89 |
| Ammonia Nitrogen, in feed, ppm | 34.6 | 34.6 | 34.6 | 34.6 |
| Ammonia Nitrogen, in effluent, ppm | 22.1 | 6.2 | 28.2 | 6.5 |
| Sludge Volume Index, Aerator outflow, ml./gram | 548 | 69 | 147 | 74 |

While the preferred application of the process of this invention is in activated sludge treatment of waste water, its use is also advantageous in conjunction with other types of biological water treatment including oxidation ponds such as those sometimes employed by the food, chemical, textile and paper industries, and described more fully in "Industrial Waste Water Control" by C. Fred Gurney, 1965, Academic Press, N.Y., N.Y.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. An improvement in the process of continuously purifying waste water to reduce the BOD, COD, and TOC thereof comprising
   a. contacting in a treatment zone a mixture of
      1. waste water which has a pH of between about 4 and 11 and which optionally has been subjected to primary treatment to remove solids, and
      2. biologically active solids in an amount sufficient to provide a total suspended solids content of the mixture of between about 10 and 50,000 parts per million,
   b. aerating the mixture by mixing a gas containing molecular oxygen through the mixture for a period of at least about 2 hours and
   c. removing the mixture from the treatment zone and separating solids from the purified water; the improvement comprising adding to the mixture in the treatment zone between about 50 and 1500 parts of activated carbon per million parts of feed waste water, said carbon having a surface area of at least 100 square meters per gram and a prticle size such that it will pass through a 200 mesh per inch sieve.

2. The process of claim 1 wherein activated carbon is added at a rate sufficient to supply between about 30 and about 1000 square meters of surface area of carbon for every liter of waste water supplied to the treatment zone.

3. The process of claim 1 wherein the mixture of step (a) contains between about 25 and 15,000 parts per million of total suspended solids, and the mixture is agitated in step (b) as the gas is mixed.

4. The process of claim 2 in which nitrogen salts, phosphorus salts or their mixtures are introduced into the treatment zone during the carrying out of step (a).

5. An improvement in an activated sludge process for continuously purifying waste water to reduce the BOD, COD, and TOC thereof comprising
   a. contacting in a treatment zone a mixture of
      1. waste water which has a pH of between about 4 and 11 and which optionally has been subjected to primary treatment to remove solids, and
      2. activated sludge in an amount sufficient to provide a total suspended solids content of the mixture of between about 300 and 50,000 parts per million.
   b. aerating the mixture by mixing a gas containing molecular oxygen through the mixture for a period of at least about 2 hours, and
   c. removing the mixture from the treatment zone, and separating solids from the purified water; the improvement comprising adding to the mixture in the treatment zone between about 50 and 1500 parts of activated carbon per million parts of feed waste water, said carbon having a surface area of at least 100 square meters per gram and a particle size such that it will pass through a 200 mesh per inch sieve.

6. The process of claim 5 in which the waste water and activated sludge are combined prior to entry into the treatment vessel.

7. The process of claim 5 wherein activated carbon is added at a rate sufficient to supply between about 30 and about 1000 square meters of surface area of carbon for every liter of waste water supplied to the treatment zone.

8. The process of claim 5 wherein the mixture of step (a) contains between about 300 and 15,000 parts per million of total suspended solids and the mixture is agitated in step (b) as the gas is mixed.

9. The process of claim 5 wherein the ratio of ppm of activated carbon to ppm of BOD fed is maintained between 0.25 and 3.5.

10. The process of claim 8 wherein the waste water feed has a pH of between about 6.5 and 7.5;
    the waste water is fed to a treatment zone containing an aqueous slurry of activated sludge, and activated carbon which has a surface area between about 600 and 1000 square meters per gram;
    a portion of the agitated mixture is removed continuously; and there is continuously fed to the treatment zone waste water, activated sludge and activated carbon at such rates that the amount of total mixed liquor solids in the zone is maintained at a concentration between about 300 and 15,000 parts per million and the activated carbon is added at a rate between about 50 and 500 parts per million parts of waste water fed to the treatment zone.

* * * * *

UNITED STATES PATENT OFFICE
CERTIFICATE OF CORRECTION

Patent No. 3,904,518　　　　　Dated September 9, 1975

Inventor(s) David Glenn Hutton et al.　　Page 1 of 2

It is certified that error appears in the above-identified patent and that said Letters Patent are hereby corrected as shown below:

The representative drawing on the title page should appear as shown on the attached sheet.

Signed and Sealed this seventeenth Day of February 1976

[SEAL]

Attest:

RUTH C. MASON
*Attesting Officer*

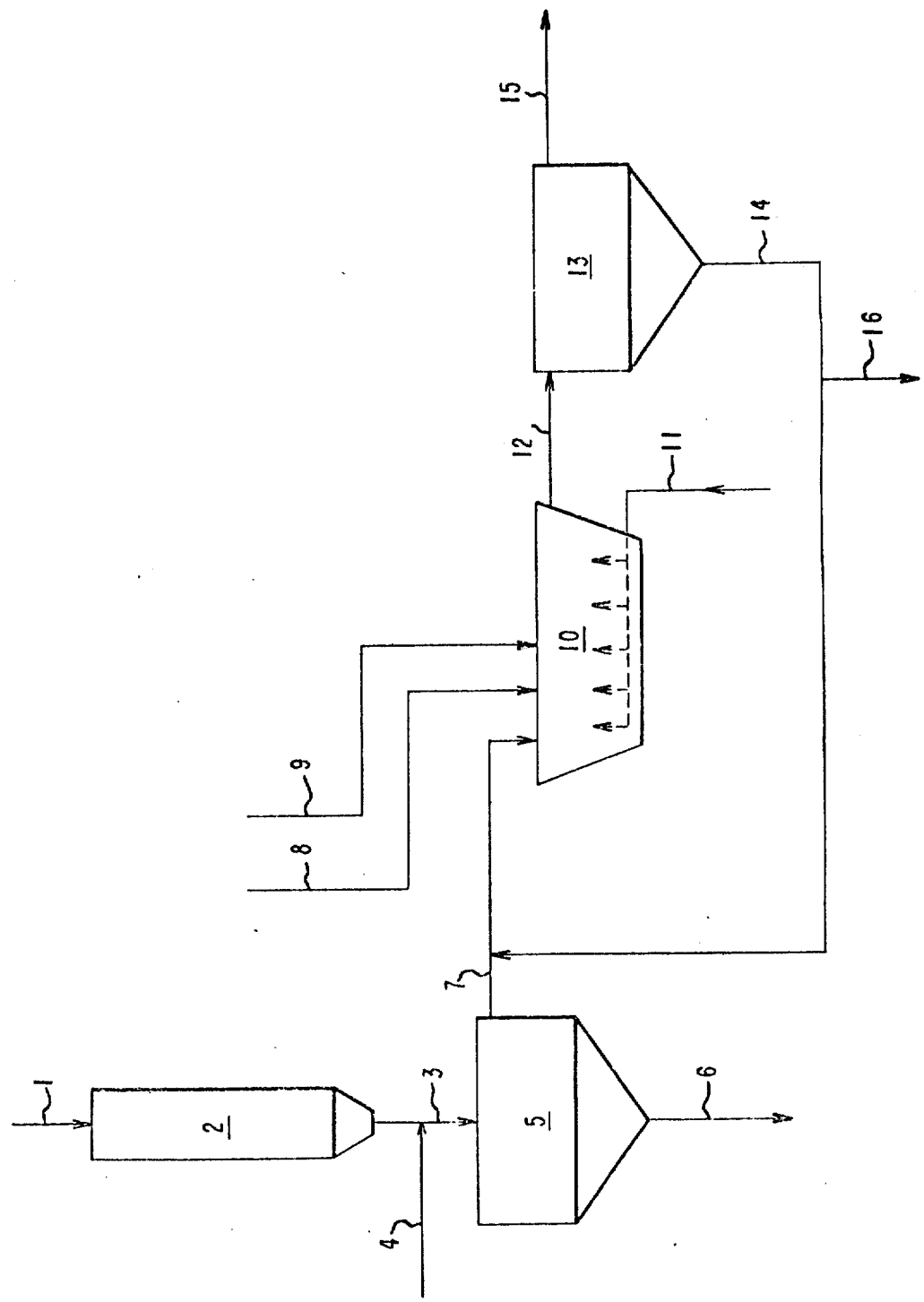

C. MARSHALL DANN
*Commissioner of Patents and Trademarks*